United States Patent [19]

Stegmaier

[11] Patent Number: 5,102,205
[45] Date of Patent: Apr. 7, 1992

[54] HYDRAULIC DUAL-CIRCUIT BRAKE SYSTEM

[75] Inventor: Alwin Stegmaier, North Charleston, S.C.

[73] Assignee: Robert Bosch GmbH, Stuttgart, Fed. Rep. of Germany

[21] Appl. No.: 654,992

[22] Filed: Dec. 14, 1991

[30] Foreign Application Priority Data

May 4, 1990 [DE] Fed. Rep. of Germany ....... 4014295

[51] Int. Cl.$^5$ .................... B60K 28/16; B60T 8/44; B60T 8/48; B60T 13/16
[52] U.S. Cl. .................... 303/113 TR; 188/181 A; 303/116 SP; 303/119 R; 303/116 R
[58] Field of Search ............... 303/116, 119, 113, 114, 303/100, 91, 110, 68, 10, 113 R, 113 TR, 113 TB, 116 R, 116 SP, 119 R, 116 PC, 116 WP, 115 R; 188/181 A; 180/197

[56] References Cited

U.S. PATENT DOCUMENTS 4,861,118 8/1989 Burckhardt et al. ........... 303/116 X
4,900,102 2/1990 Jonner et al. .
4,940,293 7/1990 Burckhardt et al. ........... 303/116 X

FOREIGN PATENT DOCUMENTS 3816073 11/1989 Fed. Rep. of Germany .

Primary Examiner—Douglas C. Butler
Attorney, Agent, or Firm—Edwin E. Greigg; Ronald E. Greigg

[57] ABSTRACT

A hydraulic dual-circuit brake system with anti-skid braking (ABS) and traction control (ASR) for motor vehicles having control valve assemblies, each control valve assigned to one wheel brake cylinder of a vehicle wheel for feeding a wheel-slip-dependent brake pressure, and includes one return pump with two separate pump elements for each brake circuit. For supplying brake pressure in traction control, a precharge pump and a valve unit are provided. In the traction control mode the precharge pump feeds brake fluid from a brake fluid tank into the pump element associated with the brake circuit of the driven wheels while the valve unit disconnects the pump element from the master brake cylinder and connects it to the brake fluid tank via a pressure limiting valve. A check valve prevents brake fluid from flowing into the ABS brake circuit during this process via the pressure limiting valve. The air bubbles created upon expansion of the brake fluid at the pressure limiting valve reach the brake fluid tank along with any excess brake fluid and thus are kept away from the master brake cylinder.

32 Claims, 2 Drawing Sheets

HYDRAULIC DUAL-CIRCUIT BRAKE SYSTEM

BACKGROUND OF THE INVENTION

The invention is based on a hydraulic dual-circuit brake system with an anti-skid system and traction control for motor vehicles.

In a known dual-circuit brake system of this type (German Patent 38 16 073, now U.S. Pat. No. 4,900,102, the wheel brake cylinders of the driven wheels are assigned to one brake circuit, and the wheel brake cylinders of the nondriven wheels are assigned to the other. The control valve assemblies for feeding a wheel slip-dependent brake pressure into the wheel brake cylinders are embodied by 3/3-way magnet valves, which are connected in pairs per brake circuit, each via a respective connecting line, to the associated brake circuit outlets of the master brake cylinder. Also connected to the same connecting lines are the outlet valves of the pump elements of the return pump, of which only one pump element is operative in one brake circuit. The electromagnetic valve unit, operative only during traction control, is embodied by a 3/2-way magnet valve, which is incorporated into the connecting line between one brake circuit outlet from the master brake cylinder and the two control valve assemblies assigned to the wheel brake cylinders of the driven wheels. In its unexcited basic position, the 3/2-way magnet valve makes this connecting line open, and in its working position, which is always brought about during traction control, it disconnects the master brake cylinder from the aforementioned control valve assemblies and connects these assemblies to the brake fluid tank for return of the fluid to the tank. A pressure limiting valve is provided in the segment of the line between the 3/2-way magnet valve and the brake fluid tank. During traction control (also known as ASR), the precharge pump, embodied as a low-pressure pump, feeds the pump element of the return pump, which generates a high brake pressure that is present at the inlet to the control valve assemblies for the wheel brake cylinders of the driven wheels. Excess brake fluid is returned to the brake fluid tank via the 3/2-way magnet valve and the pressure limiting valve. The brake pressure generated by the pump element of the return pump is fed into the wheel brake cylinder of the driven wheel exhibiting slip at a given time, and this wheel is thereby braked.

The known dual-circuit brake system is designed solely for rear-wheel drive vehicles, which have a so-called front-axle/rear-axle or front/rear brake circuit distribution.

OBJECT AND SUMMARY OF THE INVENTION

The dual-circuit brake system according to the invention has an advantage that it can equally well be used on front-wheel drive vehicles, which generally require a diagonal brake circuit distribution, and on rear-wheel-drive vehicles, which generally have front-axle/rear-axle brake circuit distribution. The return pump of the antiskid system (ABS) is used for furnishing pressure in traction control (ASR function), and for this purpose is supplied with brake fluid from the brake fluid tank by the low-pressure pump, which is switched on during traction control. The at least one reversing valve and the discharge valve for the electromagnetic valve unit assure the shutoff of the master brake cylinder and the connection of at least one pump element of the return pump to the brake fluid tank, with the interpolation of a pressure limiting valve, during traction control. A check valve prevents excess brake fluid from being able to enter the ABS brake circuit. The air bubbles produced upon expansion of the fluid at the pressure limiting-valve get into the brake fluid tank, rather than into the master brake cylinder, so that unallowable elasticity of the brake pedal will not be caused by the accumulation of air bubbles in the master brake cylinder.

If in a preferred embodiment of the invention, the precharge pump is connected to the bottom of the brake fluid tank and the discharge valve is connected to the top of the brake fluid tank, then the air bubbles produced by expansion at the pressure limiting valve and causing foaming of the brake fluid are not fed into the brake pressure supply circuit by the precharge pump during traction control.

For diagonal brake circuit distribution, all B that is needed according to a further embodiment of the invention are a second reversing valve and a further pressure limiting valve, by way of which excess brake fluid now pumped by the other pump element can also discharge into the brake fluid tank, and a further check valve, which prevents this excess brake fluid from being able to flow back into the ABS brake circuit. Both pump elements of the return pump are supplied by the precharge pump during traction control.

The invention will be better understood and further objects and advantages thereof will become more apparent from the ensuing detailed description of preferred embodiments taken in conjunction with the drawings.

DESCRIPTION OF THE PREFERRED EMBODIMENTS

Figure 1:
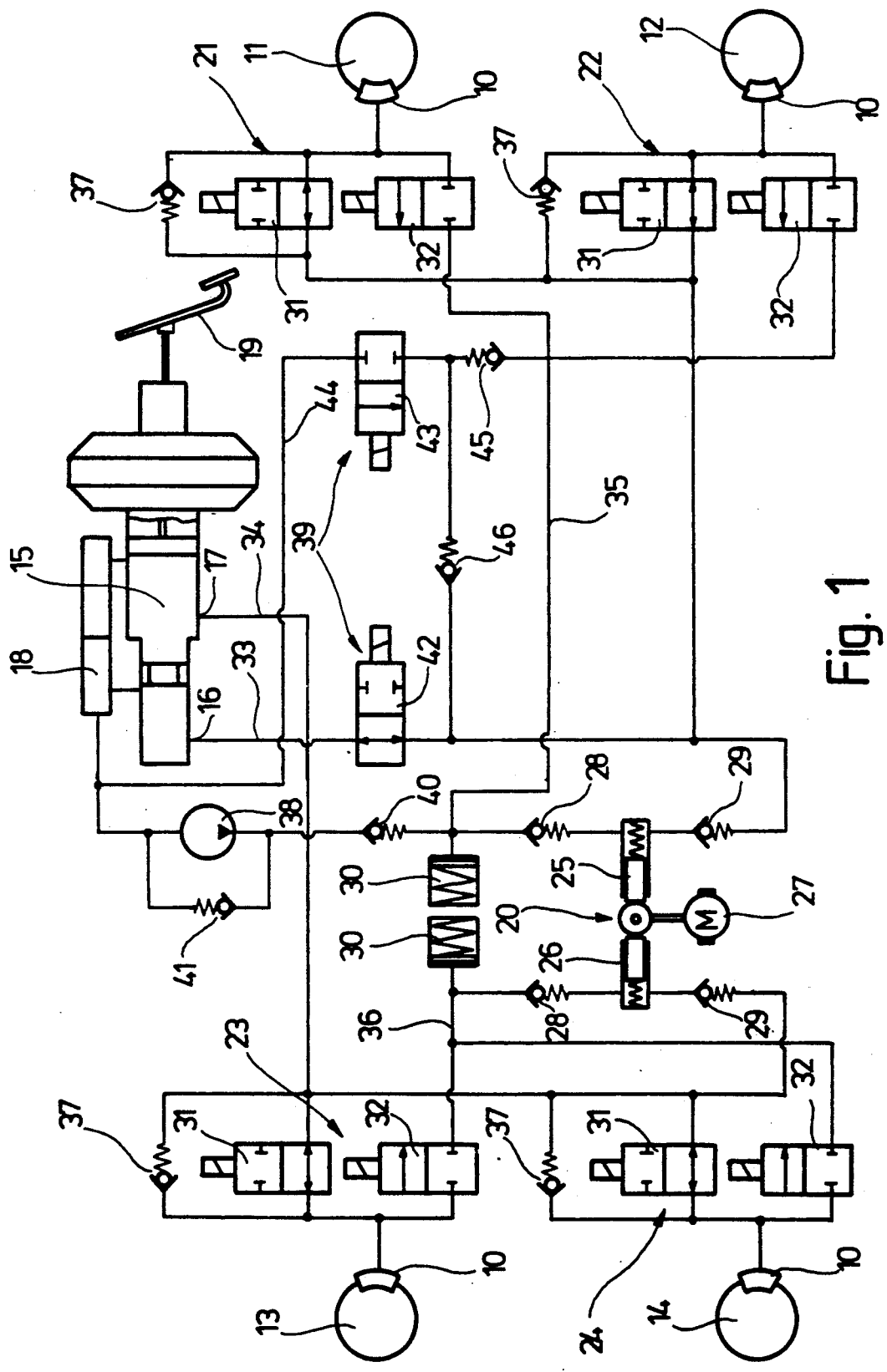
FIG. 1 is a block circuit diagram of a dual-circuit brake system with front/rear brake circuit distribution, an anti-skid system and traction control, for a passenger car.

In the hydraulic dual-circuit brake system shown in the form of a block circuit diagram in FIG. 1, having front/rear or so-called black/white brake circuit distribution, anti-skid control (ABS) and traction control (ASR), for a passenger car, the wheel brake cylinders 10 of the driven wheels 11, 12 are disposed in one brake circuit, and the wheel brake cylinders 10 of the non-driven wheels 13, 14 are disposed in the other brake circuit. The driven wheels 11, 12 are generally the rear wheels of the passenger car. In a manner known per se, the dual-circuit brake system also includes a master brake cylinder 15, which has two separate brake circuit outlets 16, 17 each for connection to one of the two brake circuits, and which communicates with a brake fluid tank 18. Upon actuation of a brake pedal 19, a brake pressure of equal magnitude is fed to the brake circuits via the two brake circuit outlets 16, 17.

The dual-circuit brake system also has four control valve assemblies 21–24, each of them assigned to one vehicle wheel 11–14, respectively, and controlled by an electronic control unit not shown here; they build up a brake pressure, dependent on the wheel slip, in the associated wheel brake cylinders 10 of the vehicle wheels 11-14. Two control valve assemblies belong to each brake circuit, that is, 21 and 22 belong to one brake circuit and 23 and 24 belong to the other. A return pump 20 has two pump elements 25, 26, which are driven in common by an electric motor 27. The pump elements 25, 26 serve to return brake fluid during pressure reduction to the wheel brake cylinders 10; one pump element 25 or 26 is operative in each brake circuit. A pump inlet one-way valve 28 and a pump outlet one-way valve 29 are disposed on each pump element 25, 26. Low-pressure reservoirs 30 connected to the pump inlet valves 28 permit a pressure reduction independently of the quantity pumped and overcome the opening pressure of the pump inlet valve 28.

Each control valve assembly 21-24 comprises a feed valve 31 and a diversion valve 32, both of which are embodied as 2/2-way magnet valves. The feed valves 31 are embodied such that in their unexcited basic position they enable an unhindered passage of brake fluid to the brake, which in their work position brought about by magnet excitation is blocked off to prevent fluid flow to the brake. Conversely, the diversion valves 32, in their working position, allow a flow of brake fluid from the brake and they prevent a fluid flow from the brakes in their unexcited basic position. The first valve connections of the feed valves 31 of the two control valve assemblies 21, 22 communicate via a first connecting line 33 with the brake circuit outlet 16, and the first valve connections of the feed valves 31 of the control valve assemblies 23, 24 communicate via a second connecting line 34 with the brake circuit outlet 17, in both cases of the master brake cylinder 15. The first valve connections of the diversion valves 32 of the control valve assemblies 21, 22 are connected via a first return line 35 to the inlet of the pump inlet valve 28 belonging to the pump element 25, while the first valve connections of the diversion valves 32 of the control valve assemblies 23 24 communicate via a second return line 36 with the inlet of the pump inlet valve 28 associated with the pump element 26. The second valve connections of the feed valve 31 and diversion valve 32 each communicate with a wheel brake cylinder 10 of the associated vehicle wheel 11-14. Connected parallel to the feed valves 31 is a respective one-way check valve 37 having a flow direction oriented toward the connecting line 16 or 17. The pump outlet valve 29 of the pump element 25 of the return pump 20 is connected to the first connecting line 33, and the pump outlet valve 29 of the pump element 26 of the return pump 20 is connected to the second connecting line 34.

For supplying brake pressure to the wheel brake cylinders 10 of the driven wheels 11, 12 during traction control, an additional apparatus is provided, which includes a precharge pump 38 and a valve unit 39. The precharge pump 38 embodied as a low-pressure pump is connected on the input side to the brake fluid tank 18 and on the output side, via a one-way check valve 40, to the pump inlet valve 28 of the pump element 25 of the return pump 20. The output flow direction of the check valve 40 is toward the pump inlet valve 28. A pressure limiting one-way valve 41 is connected parallel to the precharge pump 38. During traction control, the precharge pump 38 is switched on and supplies the pump element 25 with brake fluid from the brake fluid tank 18, while the valve 42 of valve unit 39 breaks the communication between the pump element 25 and the master brake cylinder 15 and instead establishes communication between the pump element 25 and the brake fluid tank 18, via a pressure limiting valve one-way 46 and valve 43 of valve unit 39. In detail, the valve unit 39 comprises a reversing valve 42 and a discharge valve 43, both of them embodied as 2/2-way magnet valves. The reversing valve 42 is disposed in the first connecting line 33 between the brake circuit outlet 16 of the master brake cylinder 15 and the control valve assemblies 21, 22 of the driven wheels 11, 12, with which the pump element 25 is also connected, via its pump outlet valve 29. In the unexcited basic position of the reversing valve 42, there is unhindered passage of the brake fluid from the master brake cylinder 15 to the control valve assemblies 21, 22, while in the working position, which can be brought about by magnet excitation, this passage is blocked. The discharge valve 43 is incorporated in a connection line 44 that connects the first return line 35 to the brake fluid tank 18. In the working position of the discharge valve 43, there is an unhindered passage to the brake fluid tank 18, while in the unexcited basic position of the discharge valve 43 this passage is closed. In the line segment between the first return line 3B and the discharge valve 43, there is a one-way check valve 45, the flow direction of which is toward the discharge valve 43. The opening pressure of the check valve 45 is set higher than the opening pressure of the pump inlet valve 28 of the pump element 25. The pressure limiting valve 46 is connected on the one hand to the line segment of the first connecting line 33 located between the pump outlet valve 29 of the pump element 25 and the reversing valve 42, and on the other to the segment of the connection line 44 between the check valve 45 and the discharge valve 43. The opening direction of the pressure limiting valve 46 is toward the discharge valve 43. The valve arrangement 39 comprising the reversing valve 42 and the discharge valve 43 is likewise controlled by the electronic control unit, not shown here.

The ABS control function of the anti-skid system is known per se. The valve unit 39 and initially all the control valve assemblies 21-24 assume their basic position shown in FIG. 1. Upon actuation of the brake pedal 19, via the brake circuit outlets 16, 17 of the master brake cylinder 15, a brake pressure is fed into the two brake circuits. Via the feed valves 31, this pressure reaches the wheel brake cylinders 10 of the vehicle wheels 11-14, where it causes the brake calipers to be applied. Slippage of the braked wheels is prevented by modulating the brake pressure in the wheel brake cylinders 10, to which end the control valve assemblies 21-24 are triggered upon the appearance of wheel slip. If the feed valve 31 is reversed, then the associated brake cylinder 10 is disconnected from the master brake cylinder 15. The pressure fed into the wheel brake cylinder 10 is held, that is, not changed. If the diversion valve 32 is reversed, then the wheel brake cylinder 10 is connected to the low-pressure reservoir 30 and, via the pump inlet valve 28, to the return pump 20. Brake fluid can discharge out of the wheel brake cylinder 10 into the low-pressure reservoir 30 and from there is pumped back into the master brake cylinder 15 by the return pump 20 via the reversing valve 42. The pressure in the wheel brake cylinder 10 is reduced accordingly.

In traction control, the slippage of at least one driven wheel 11, 12 is detected by wheel slip sensors, not shown here, and imparted to the electronic control unit. The electronic control unit causes magnet excitation of the valve unit 39, thereby reversing both the reversing valve 42 and the discharge valve 43. The pump element 25 of the return pump 20 is thereby uncoupled from the master brake cylinder 15 and connected via the pressure limiting valve 46 to the brake fluid tank 18. At the same time, the switched-on precharge pump 38 starts up and feeds brake fluid from the brake fluid tank 18 to the pump element 25. The pump element 25 generates a high brake pressure, which via the pump outlet valve 29 is present at the control valve assemblies 21, 22 of the driven wheels 11, 12 and via the feed valves 31 reaches the associated wheel brake cylinders 10 of the driven wheels 11, 12. If only one driven wheel, for instance the wheel 11, is spinning, then by means of the electronic control unit the feed valve 31 of the control valve assembly 22 associated with the nonspinning driven wheel 12 is reversed, so that the wheel brake cylinder 10 of the driven wheel 12 is blocked off from the brake pressure supply, and brake pressure is built up only in the wheel brake cylinder 10 of the spinning driven wheel 11. The brake pressure required for slowing down the spinning driven wheel 11 is established by pressure modulation, which is effected by switching the feed valve 3 and diversion valve 32. If neither of the two valves is triggered, then brake pressure buildup takes place; if only the feed valve 31 is reversed, then the built-up pressure in the wheel brake cylinder 10 is maintained, and if the diversion valve 32 is reversed additionally, then the brake pressure in the wheel brake cylinder 10 is reduced. Excess brake fluid pumped by the return pump 20 and not needed to cover the need for brake fluid in the wheel brake cylinders 10 is returned to the brake fluid tank 18 via the pressure limiting valve 46 and the discharge valve 43.

Toward the end of traction control, once no further drive slip is sensed, the electronic control unit triggers the feed valves 31 and diversion valves 32 of the two control valve assemblies 21, 22, thereby connecting the wheel brake cylinders 10 of the driven wheels 11, 12 to the first return line 35. Brake fluid can now flow out of the wheel brake cylinders 10 via the return line 35 to the lowpressure reservoir 30, and from there it is pumped back into the brake fluid tank 18 by the pump element 25, via the pressure limiting valve 46 and the discharge valve 43. Next, the feed valve and diversion valve 32 of the control valve assemblies 21, 22 and the reversing valve 42 and discharge valve 43 of the valve unit 39 are returned to their basic position by the cessation of the magnet excitation. In the event of traction control of both driven wheels 11, 12, the feed valves 31 and the diversion valves 32 of both control valve assemblies 21, 22 are triggered in the manner described for brake pressure modulation.

Figure 2:
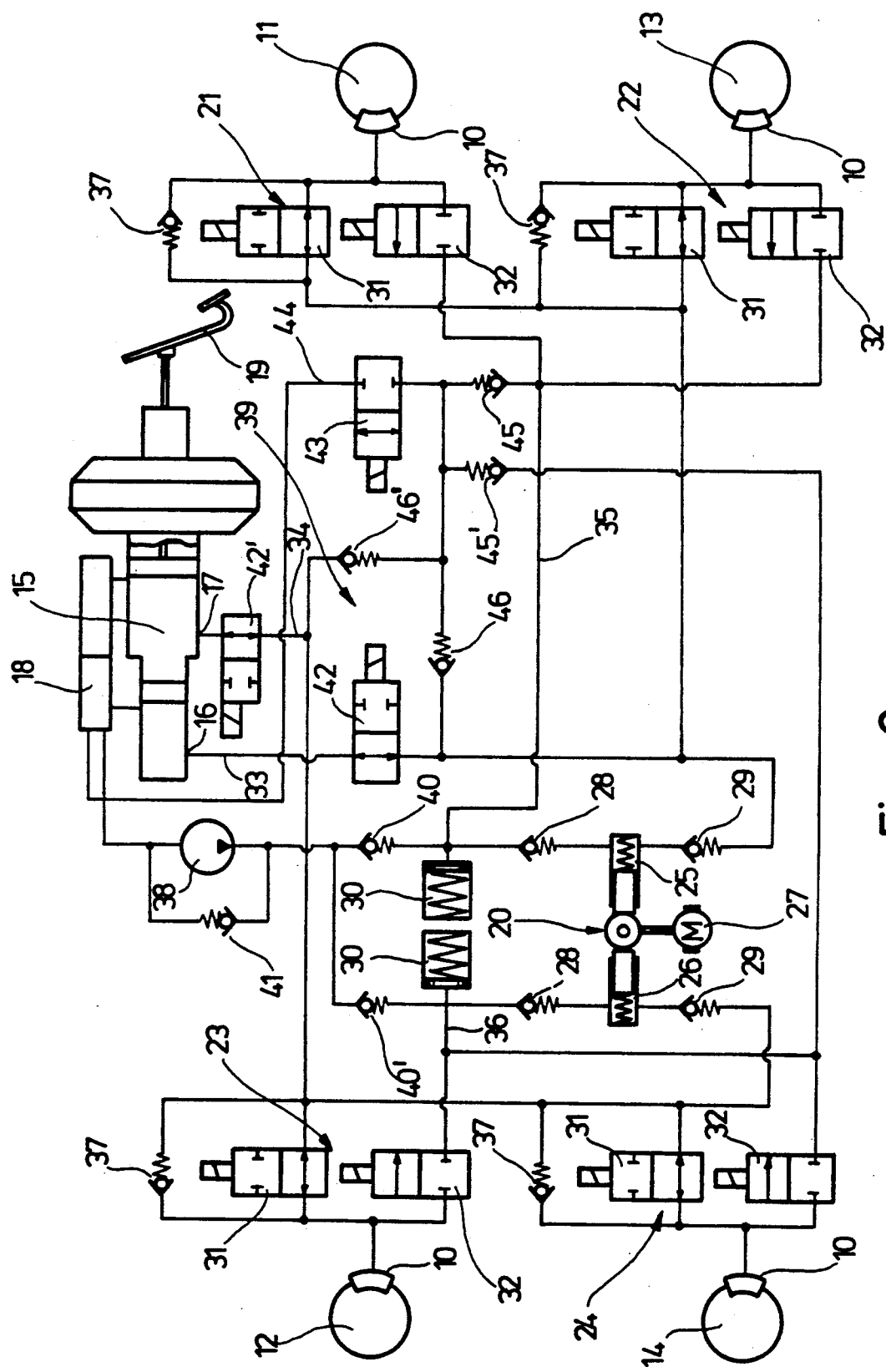
FIG. 2 is a block circuit diagram of a dual-circuit brake system with diagonal brake circuit distribution, an anti-skid system and traction control, for a passenger car.

In the further exemplary embodiment, shown in the form of a block circuit diagram in FIG. 2, of a dual-circuit brake system with diagonal brake circuit distribution, anti-skid control (ABS) and traction control (ASR) for passenger cars, one driven wheel 11, 12 is disposed in each of two brake circuits. Generally, these driven wheels 11, 12 are the front wheels of the passenger car. To the extent that the dual-circuit brake system matches the dual-circuit brake system described in FIG. 1 for front axle/rear axle brake circuit distribution, identical components are identified by the same reference numerals.

In traction control, the precharge pump 38 additionally, via a further check valve 40', feeds into the pump element 26 of the return pump 20. The valve unit 39 has a second reversing valve 42', which is disposed in the second connecting line 34 between the brake circuit outlet 17 of the master brake cylinder 15 and the control valve assemblies 23, 24. The further reversing valve 42' is embodied identically to the reversing valve 42 and is likewise triggered in the same way by the electronic control unit. The return line 36 between the pump inlet valve 28 of the pump element 26 and the control valve assemblies 23, 24 is connected via a further check valve 45' to the second of the connecting line 44 that is defined by the check valve 45 and the discharge valve 43. The flow direction of the check valve 45' is likewise toward the discharge valve 43, and the opening pressure of the check valve 45' is set higher than the opening pressure of the pump inlet valve 28 preceding the pump element 26. A further pressure limiting valve 46' is connected on the one hand to the segment of the second return line 34 located between the control valve assemblies 23, 24 and the further reversing valve 42' and on the other to the segment of the connecting line 44 that is defined by the check valve 45 and the discharge valve 43. The opening direction of the pressure limiting valve 46' is toward the discharge valve 43. In modification from the dual-circuit brake system of FIG. 1, the wheel brake cylinder 10 of the driven wheel 12 is connected to the control valve assembly 23, and the wheel brake cylinder 10 of the nondriven wheel 13 is connected to the control valve assembly 22.

The mode of operation of the dual-circuit brake system of FIG. 2 during traction control is the sam as described above, except for the fact that brake supply pressure is generated by the return pump 20 in both brake circuits. So the brake pressure will not reach the wheel brake cylinders 1 of the nondriven wheels 13, 14, during traction control the 10 control valve assemblies 22, 24 of the nondriven wheels 13, 14 are changed to their blocking position by excitation of the feed valves 31, so that the wheel brake cylinders 10 of the nondriven wheels 13, 14 are disconnected from the brake pressure supply. A slipping driven wheel 11, 12 is braked in the same way as described above, by brake pressure modulation in the wheel brake cylinder 10.

The invention is not limited to the exemplary embodiments described. For instance, the control valve assemblies 21–24 may also be embodied in the form of 3/3-way magnet valves, in which the first valve connections communicate with the connecting lines 33 and 34, the second valve connections communicate with the return lines 35 and 36, and the third valve connections are each connected to the associated wheel brake cylinder. In the unexcited basic position of the 3/3-way magnet valves, the wheel brake cylinders 10 communicate with the master brake cylinder 15; in the terminal valve position that can be brought about by excitation with maximum current, the wheel brake cylinders are connected to the return lines 35, 36; and in the middle valve position, which can be brought about by excitation with half the maximum current, the wheel brake cylinders 10 are blocked, so that the brake pressure built up in them is maintained.

The foregoing relates to a preferred exemplary embodiment of the invention, it being understood that other variants and embodiments thereof are possible within the spirit and scope of the invention, the latter being defined by the appended claims.

What is claimed and desired to be secured by Letters Patent of the U.S. is:

1. A hydraulic dual-circuit brake system with an anti-skid system and traction control for motor vehicles, which comprises a master brake cylinder (15) with first and second separate brake circuits connected with outlets (16, 17) for feeding a brake pressure by brake pedal actuation to wheel brake cylinders (10) of wheels (11-14), a brake fluid tank (18) that includes a top and a bottom connection, said brake fluid tank communicates with the master brake cylinder, respective control valve assemblies (21-24), one each assigned to one wheel brake cylinder (10) of a vehicle wheel for feeding a wheel slip-dependent brake pressure to said one wheel brake cylinder, each said valve assembly communicates with an associated wheel brake cylinder and with the master brake cylinder, each said valve assembly includes two control valves (31, 32) each assigned to one wheel brake cylinder connected with each two control valves via first and second connecting lines of said first and second brake circuits of the master brake cylinder, a return pump (20) for returning brake fluid to said brake cylinders upon brake pressure reduction, said return pump includes first and second separate pump elements (25, 26) each operative in one of said firs and second separate brake circuits, said first and second pump elements are each connected via a pump inlet valve (28) and to each said control valve assembly associated with said first and second brake circuits connected to the wheel brake cylinders and via a respective pump outlet valve (29) are each connected to one of said first and second connecting lines to the brake circuit outlets of the master brake cylinder, a precharge pump (38) for generating a brake supply pressure upon traction control, said precharge pump is connected on an inlet side to the brake fluid tank and on an outlet side to the pump inlet valve (28) of said first pump element (25) associated with at least one driven wheel, and also has an electromagnetic valve unit (39), which upon traction control blocks fluid to the control valve assemblies (31, 32) connected with the wheel brake cylinders (10) of the driven wheels (11, 12) and the first pump element (25) is blocked from the master brake cylinder and via a pressure limiting valve that connects said control valve assemblies (31, 32) to the brake fluid tank, the valve unit (39) includes a discharge valve (43) and at least one reversing valve (42), of which the reversing vale (42) is incorporated into said first connecting line (33) between the control valve assemblies (21, 22) associated with the wheel brake cylinders of the driven wheels (11, 12) and said brake circuit outlet (16) of the mater brake cylinder (15), and the discharge valve (43) is incorporated in a third connecting line (44) connecting said control valve assemblies 921, 22) of the driven wheels to the brake fluid tank (18); a check valve (45) having a flow direction toward the discharge valve (43) is incorporated in a segment of the third connecting line between the discharge vale (43) and the control valve assemblies (21, 22) of the driven wheels; a pressure limiting valve (46) is connected to a segment of a fourth connecting line between the control valve assemblies (21, 22) and the reversing vale (42) and to the segment of the third connecting line between the check valve (45) and the discharge valve (43), with a flow direction toward the discharge valve (43); and an opening pressure of the check valve (45) is set higher than an opening pressure of the pump inlet valve (28) that is located at the first connecting line (33) containing the reversing valve (42).

2. A brake system as defined by claim 1, with diagonal brake circuit distribution, in which the wheel brake cylinders of the driven wheels are in different brake circuits, in that one first and second reversing valve is provided win each.first and second connecting line (33, 34) of brake circuit outlets (16, 17) of the master brake cylinder (15) to the control valve assemblies (21, 22 ad 23, 24) of the first and second brake circuits; a first and second check valve (45, 45') is disposed one each in a connecting line segment between the discharge valve (43) and the control valve assembly (21, 23) associated with a wheel brake cylinder (10) of a driven wheel (11, 12); a first and second pressure limiting valve (46, 46') is connected respectively between each connecting line segment between the first and second check valve (45, 45') and the discharge valve (43) on the one hand, and each connecting line segment between the control valve assemblies (21, 22 and 23, 24) and the associated first and second reversing valve (42, 42'); the opening pressure of the first and second check valves (45, 45') is set higher than the opening pressure of the pump inlet valves (28) of the pump elements (26); and the outlet of the precharge pump (38) communicates via a respective inlet valve (28) with each first and second pump element (25, 26).

3. A brake system as defined by claim 1, in which a check valve (40, 40') having a flow direction toward the pump inlet valve (28) is disposed between the outlet of the precharge pump (48) and the pump inlet valve (28).

4. A brake system as defined by claim 2, in which a check valve (40, 40') having a flow direction toward the pump inlet valve (28) is disposed between the outlet of the precharge pump (48) and the pump inlet valve (28).

5. A brake system as defined by claim 1, in which a pressure limiting valve (41) having an opening direction toward the brake fluid tank is connected parallel to the precharge pump (38).

6. A brake system as defined by claim 2, in which a pressure limiting valve (41) having an opening direction toward the brake fluid tank is connected parallel to the precharge pump (38).

7. A brake system as defined by claim 3, in which a pressure limiting valve (41) having an opening direction toward the brake fluid tank is connected parallel to the precharge pump (38).

8. A brake system as defined by claim 4, in which a pressure limiting valve (41) having an opening direction toward the brake fluid tank is connected parallel to the precharge pump (38).

9. A brake system as defined by claim 1, in which a low-pressure reservoir (30) is connected to the inlet of each pump inlet valve (28) of the return pump (20).

10. A brake system as defined by claim 2, in which a low-pressure reservoir (30) is connected to the inlet of each pump inlet valve (28) of the return pump (20).

11. A brake system as defined by claim 3, in which a low-pressure reservoir (30) is connected to the inlet of each pump inlet valve (28) of the return pump (20).

12. A brake system as defined by claim 5, in which a low-pressure reservoir (30) is connected to the inlet of each pump inlet valve (28) of the return pump (20).

13. A brake system as defined by claim 1, in which the connection of the precharge pump (38) is connected to the bottom of the brake fluid tank (18), and the connection of the discharge valve (43) is effected to the top of the brake fluid tank (18).

14. A brake system as defined by claim 2, in which the connection of the precharge pump (38) is connected to the bottom of the brake fluid tank (18), and the connection of the discharge valve (43) is effected to the top of the brake fluid tank (18).

15. A brake system as defined by claim 3, in which the connection of the precharge pump (38) is connected to the bottom of the brake fluid tank (18), and the connection of the discharge valve (43) is effected to the top of the brake fluid tank (18).

16. A brake system as defined by claim 5, in which the connection of the precharge pump (38) is connected to the bottom of the brake fluid tank (18), and the connection of the discharge valve (43) is effected to the top of the brake fluid tank (18).

17. A brake system as defined by claim 9, in which the connection of the precharge pump (38) is connected to the bottom of the brake fluid tank (18), and the connection of the discharge valve (43) is effected to the top of the brake fluid tank (18).

18. A brake system as defined by claim 11, in which the connection of the precharge pump (38) is connected to the bottom of the brake fluid tank (18), and the connection of the discharge valve (43) is effected to the top of the brake fluid tank (18).

19. A brake system as defined in claim 1, in which said first and second reversing valves (42, 42') and the discharge valve (43) are embodied as 2/2-way magnet valves, and that said first and second reversing valves (42, 42') have a fluid blocking position brought about by magnet excitation, and the discharge valve (43) has a blocking position in an unexcited basic position.

20. A brake system as defined by claim 2, in which said first and second reversing valves (42, 42') and the discharge valve (43) are embodied as 2/2-way magnet valves, and that said first and second reversing valves (42, 42') have a fluid blocking position brought about by magnet excitation, and the discharge valve (43) has a blocking position in an unexcited basic position.

21. A brake system as defined by claim 3, in which said first and second reversing valves (42, 42') and the discharge valve (43) are embodied as 2/2-way magnet valves, and that said first and second reversing valves (42, 42') have a fluid blocking position brought about by magnet excitation, and the discharge valve (43) has a blocking position in an unexcited basic position.

22. A brake system as defined by claim 5, in which said first and second reversing valves (42, 42') and the discharge valve (43) are embodied as 2/2-way magnet valves, and that said first and second reversing valves (42, 42') have a fluid blocking position brought about by magnet excitation, and the discharge valve (43) has a blocking position in an unexcited basic position.

23. A brake system as defined by claim 9, in which said first and second reversing valves (42, 42') and the discharge valve (43) are embodied as 2/2-way magnet valves, and that said first and second reversing valves (42, 42') have a fluid blocking position brought about by magnet excitation, and the discharge valve (43) has a blocking position in an unexcited basic position.

24. A brake system as defined by claim 13, in which said first and second reversing valves (42, 42') and the discharge valve (43) are embodied as 2/2-way magnet valves, and that said first and second reversing valves (42, 42') have a fluid blocking position brought about by magnet excitation, and the discharge valve (43) has a blocking position in an unexcited basic position.

25. A brake system as defined in claim 1, in which each control valve assembly (21-24) has a feed valve (31) and a diversion valve (32); that each said feed valve has a first valve connection connected by the first connecting line (33) to the brake circuit outlet (16) of the master brake cylinder (15), and a first valve connection of the diversion valve (32) is connected to the pump inlet valve (28) of the associated pump element (25, 26) of the return pump (20) and to the third connecting line (44) to the brake fluid tank (18); and the two valve connections of the feed valve (31) and the diversion valve (32) communicate with the wheel brake cylinder (10) of the associated vehicle wheel (11-14).

26. A brake system as defined in claim 2, in which each control valve assembly (21-24) has a feed valve (31) and a diversion valve (32); that each said feed valve has a first valve connection connected by the first connecting line (33) to the brake circuit outlet (16) of the master brake cylinder (15), and a first valve connection of the diversion valve (32) is connected to the pump inlet valve (28) of the associated pump element (25, 26) of the return pump (20) and to the third connecting line (44) to the brake fluid tank (18); and the two valve connections of the feed valve (31) and the diversion valve (32) communicate with the wheel brake cylinder (10) of the associated vehicle wheel (11-14).

27. A brake system as defined in claim 3, in which each control valve assembly (21-24) has a feed valve (31) and a diversion valve (32); that each said feed valve has a first valve connection connected by the first connecting line (33) to the brake circuit outlet (16) of the master brake cylinder (15), and a first valve connection of the diversion valve (32) is connected to the pump inlet valve (28) of the associated pump element (25, 26) of the return pump (20) and to the third connecting line (44) to the brake fluid tank (18); and the two valve connections of the feed valve (31) and the diversion valve (32) communicate with the wheel brake cylinder (10) of the associated vehicle wheel (11-14).

28. A brake system as defined in claim 5, in which each control valve assembly (21-24) has a feed valve (31) and a diversion valve (32); that each said feed valve has a first valve connection connected by the first connecting line (33) to the brake circuit outlet (16) of the master brake cylinder (15), and a first valve connection of the diversion valve (32) is connected to the pump inlet valve (28) of the associated pump element (25, 26) of the return pump (20) and to the third connecting line (44) to the brake fluid tank (18); and the two valve connections of the feed valve (31) and the diversion valve (32) communicate with the wheel brake cylinder (10) of the associated vehicle wheel (11-14).

29. A brake system as defined in claim 9, in which each control valve assembly (21-24) has a feed valve (31) and a diversion valve (32); that each said feed valve has a first valve connection connected by the first connecting line (33) to the brake circuit outlet (16) of the master brake cylinder (15), and a first valve connection of the diversion valve (32) is connected to the pump inlet valve (28) of the associated pump element (25, 26) of the return pump (20) and to the third connecting line (44) to the brake fluid tank (18); and the two valve connections of the feed valve (31) and the diversion valve (32) communicate with the wheel brake cylinder (10) of the associated vehicle wheel (11-14).

30. A brake system as defined in claim 13, in which each control valve assembly (21-24) has a feed valve (31) and a diversion valve (32); that each said feed valve has a first valve connection connected by the first connecting line (33) to the brake circuit outlet (16) of the master brake cylinder (15), and a first valve connection of the diversion valve (32) is connected to the pump inlet valve (28) of the associated pump element (25, 26) of the return pump (20) and to the third connecting line (44) to the brake fluid tank (18); and the two valve connections of the feed valve (31) and the diversion valve (32) communicate with the wheel brake cylinder (10) of the associated vehicle wheel (11-14).

31. A brake system as defined in claim 19, in which each control valve assembly (21-24) has a feed valve (31) and a diversion valve (32); that each said feed valve has a first valve connection connected by the first connecting line (33) to the brake circuit outlet (16) of the master brake cylinder (15), and a first valve connection of the diversion valve (32) is connected to the pump inlet valve (28) of the associated pump element (25, 26) of the return pump (20) and to the third connecting line (44) to the brake fluid tank (18); and the two valve connections of the feed valve (31) and the diversion valve (32) communicate with the wheel brake cylinder (10) of the associated vehicle wheel (11-14).

32. A brake system as defined in claim 25, in which a pressure limiting valve (37) having an opening direction toward the first connecting line (33) is connected parallel to the feed valve (31).

* * * * *